United States Patent [19]
Ruehle et al.

[11] Patent Number: 5,127,090
[45] Date of Patent: Jun. 30, 1992

[54] MAP INTERFACE UNIT FOR INDUSTRIAL PROGRAMMABLE LOGIC CONTROLLERS

[75] Inventors: Lyle L. Ruehle, Franklin; Hamid Karshenas, Milwaukee; Brian T. Hill, Meguon; James B. Mikulich, Waukesha, all of Wis.

[73] Assignee: Square D Company, Palatine, Ill.

[21] Appl. No.: 579,748

[22] Filed: Sep. 7, 1990

[51] Int. Cl.⁵ .................. G06F 13/38; G06F 15/46
[52] U.S. Cl. .................. 395/325; 364/DIG. 1; 364/284.4; 364/242.95; 364/926.93; 364/940.62; 364/927.96
[58] Field of Search ... 364/200 MS File, 900 MS File; 395/275, 325

[56] References Cited

U.S. PATENT DOCUMENTS

| | | |
|---|---|---|
| 4,831,582 | 5/1989 | Miller et al. ............... 364/900 |
| 4,926,375 | 5/1990 | Mercer et al. ............... 364/900 |
| 4,989,139 | 1/1991 | Friedman et al. ........... 364/200 |

Primary Examiner—Thomas M. Heckler
Attorney, Agent, or Firm—Michael J. Femal; Thomas K. Stine

[57] ABSTRACT

"A Manufacturing Automation Protocol (MAP) interface unit couples a local area network (LAN) to a MAP network. The LAN includes a plurality of industrial programmable logic controllers (PLCs) and the MAP network includes a plurality of MAP devices. The MAP interface unit comprises a CPU for performing a plurality of routines. A first routine controls the coupling of the MAP interface unit to the MAP network and a second routine controls the coupling of the MAP interface unit to the LAN. A further routine disposed between the first coupling routine and the second coupling routine converts messages from the MAP devices on the MAP network to messages to the PLCs on the LAN and converts messages from the PLCs to messages to the MAP devices. These messages are either requests for data or responses with data to these requests."

12 Claims, 3 Drawing Sheets

FIG_1

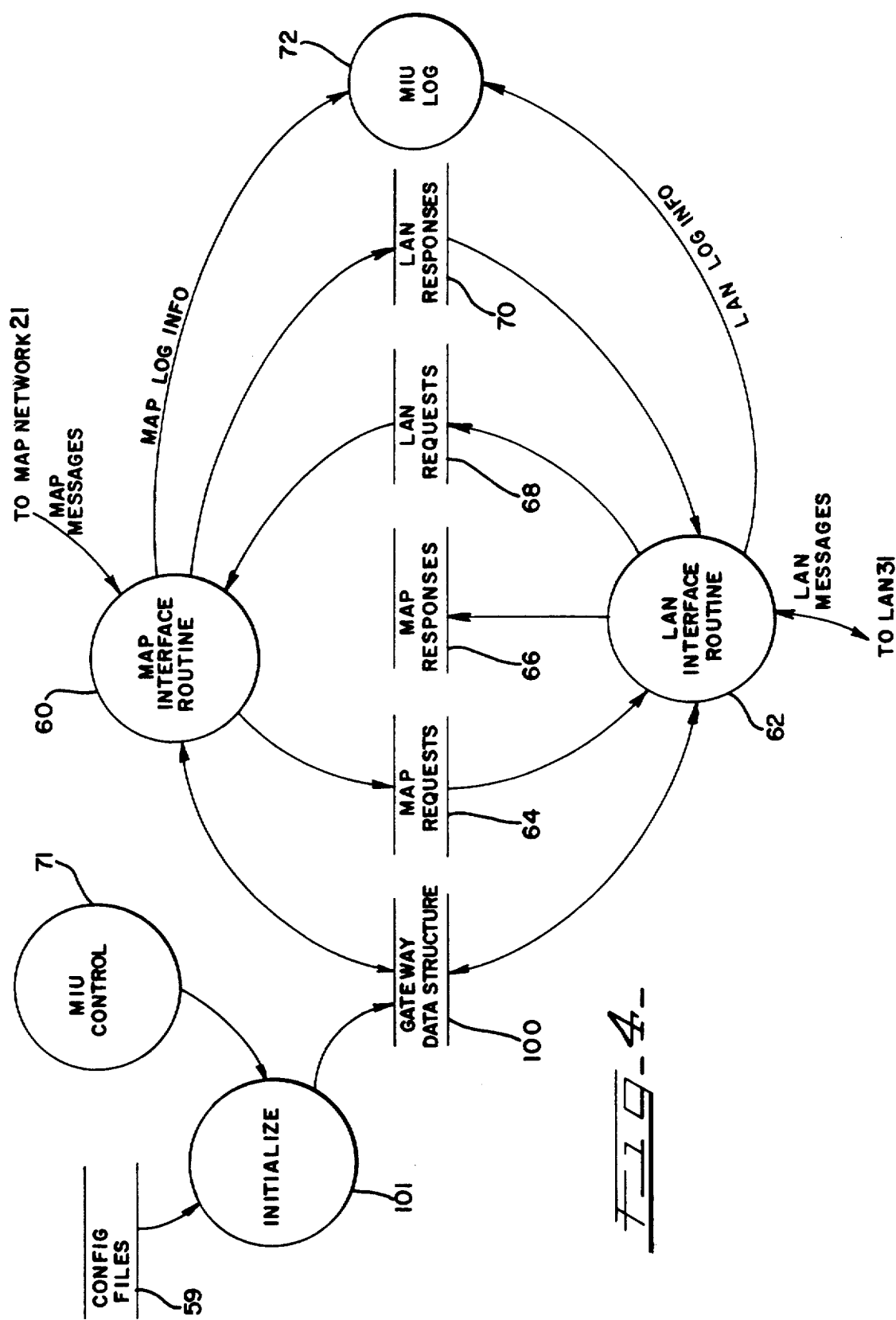

MAP INTERFACE UNIT FOR INDUSTRIAL PROGRAMMABLE LOGIC CONTROLLERS

DESCRIPTION

1. Technical Field

Applicant's invention relates to networking of computer based devices and, more particularly, to an interface for communicatively coupling a local area network of programmable logic controllers to other computer based devices on a MAP (Manufacturing Automation Protocol) network.

2. Related Applications

This application is related to commonly assigned co-pending applications: Ser. No. 179,674 for "Peer-to-Peer Register Exchange Controller for PLCs"; and Ser. No. 258,779 for "Peer-to-Peer Register Exchange Controller for Industrial Programmable Controllers", the specifications of which are expressly incorporated herein.

BACKGROUND OF THE INVENTION

As industrial automation advances, interconnectivity between various microprocessor based plant floor devices, such as programmable logic controllers ("PLCs"), and plant computers, becomes more and more desirable. However, as such microprocessor based devices and computers are made by various vendors utilizing their own various communication protocols, interconnectivity between such devices has been hampered, requiring application programs to be dedicated often to a single product and, consequently, non-transportable or reusable in future applications.

To help alleviate this problem, a seven-layer Open Systems Interconnection (OSI) communication model was specified by the International Standards Organization (ISO).

According to this model, layer 1 defines the physical layer, layer 2 defines the data link layer, layer 3 defines the network layer, layer 4 defines the transport layer, layer 5 defines the session layer, layer 6 defines the presentation layer and layer 7 defines the application layer. OSI specifies general guidelines, but does not specify how these guidelines are to be realized.

One protocol developed in accordance with the OSI model is commonly referred to "Manufacturing Automation Protocol", or simply MAP, which utilizes messages conforming with a protocol known as Manufacturing Message Specification, or MMS.

MAP is a communication networking standard initiated by General Motors Corporation and supported by the World Federation. It relies on the above seven independent, yet functionally supportive layers which serve as an accepted set of rules for data exchange within the manufacturing environment. The current MAP version is 3.0. MAP connectivity simplifies the task of data exchange between factory control devices and higher level manufacturing computers, typically supplied by a variety of vendors. So long as a device outputs its messages in accordance with MMS, all other devices on the MAP network should be able to recognize its messages.

Often, factory control devices, such as programmable logic controllers (PLCs) are interconnected via a local area network, or LAN, such as the SY/NET network of Square D Company, Palatine, Ill. It has been found to be beneficial to also permit these PLCs to exchange information with higher level computers.

On the PLC level, Systems Integration Specialists Co., (SISCO) of Warren, Mich., has developed an interface which couples PLCs on an Allen Bradley Data Highway local area network to a MAP network. However, in this system, the PLCs on the Data Highway network can only function as "servers", rather than as "clients" on the MAP network. Thus, they can only respond to requests from clients on the MAP network and are unable to generate their own requests out onto the MAP network. This greatly limits their overall effectiveness.

Applicant's invention is provided to solve this and other problems.

SUMMARY OF THE INVENTION

It is an object of the invention to provide a Manufacturing Automation Protocol (MAP) interface for coupling a local area network (LAN) to a MAP network. The LAN includes a plurality of PLCs and the MAP network includes a plurality of MAP devices.

In accordance with the invention, the MAP interface comprises a first routine for coupling the MAP interface to the MAP network and a second routine for coupling the MAP interface to the LAN. The interface further includes a routine disposed between the first coupling routine and the second coupling routine for converting MAP requests from the MAP network to a request to a respective one of the PLCs and for converting LAN requests from the LAN network to a request to a respective one of the MAP devices.

Other features and advantages of the invention will be apparent from the following specification taken in conjunction with the following drawings.

BRIEF DESCRIPTION OF DRAWINGS

FIG. 4 is a data flow diagram of the MIU routine of FIG. 3.

DESCRIPTION OF THE PREFERRED EMBODIMENT

Figure 1:
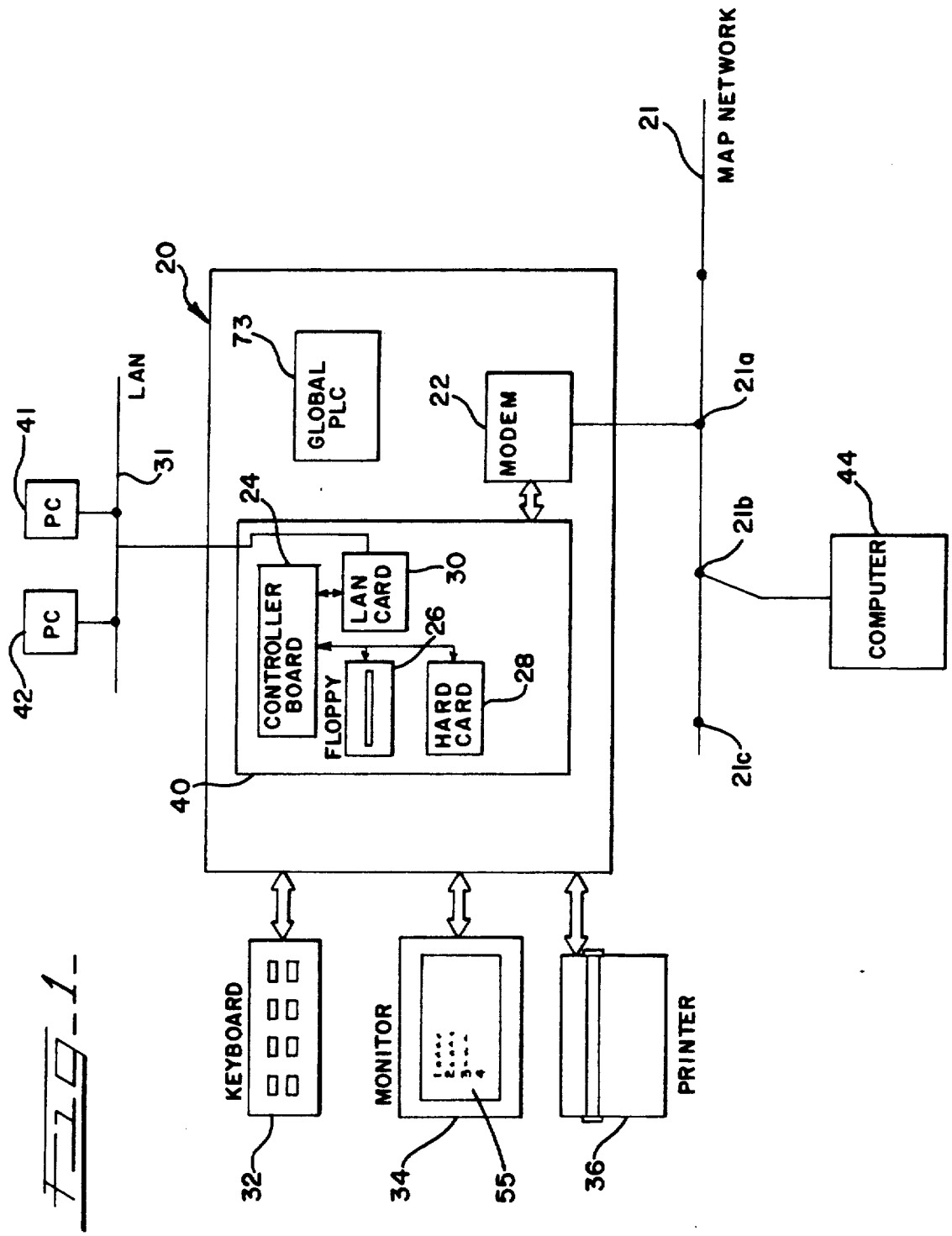
FIG. 1 is an overall block diagram of a plurality of PLCs on an LAN coupled to a MAP network by a MAP interface unit.

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the particular embodiment illustrated.

A MAP Interface Unit (MIU) 20 coupled at a MAP node 21a to a MAP network 21 is illustrated in FIG. 1. The MIU 20 includes a modem 22, a controller board 24, a floppy disc drive 26, and a hard card 28. The MIU 20 further includes a local area network, or LAN, card 30 for coupling the MIU 20 to a local area network (LAN) 31. The MIU 20 also includes standard peripheral devices including a keyboard 32, a monitor 34 and a printer 36. The keyboard 32, monitor 34 and printer 36 provide interfacing with a user.

The controller board 24 is a central processing unit which either directly or indirectly through other boards, functionally controls the MIU 20 through PC Bus interface circuitry (not shown). The controller board 24 includes one megabyte of system memory, a real-time clock with battery, Basic Input Output System (BIOS) Read Only Memory (ROM) and DMA circuitry.

The modem 32 may be of one of two modem types, either a Type SFI-551 MAP Broadband Modem or Type SFI-552 MAP Carrierband Modem. In the preferred embodiment, the modem 22 is sold by Concord Communications, Inc., of Marlboro, Mass. The Broadband modem transmits and receives data at 10 megabytes per second (10 Mbps) over a CATV cable system and works in conjunction with a head-end remodulator (not shown). The Broadband modem may transmit on one frequency to the head-end remodulator which receives these transmissions and remodulates them to a different frequency. The transmissions are then forwarded at the new frequency to the receiving device. Conversely, the Carrierband modem transmits and receives data at 5 megabytes per second (5 Mbps) on the same frequency.

The modem 22 as provided by Concord includes a bus controller (not shown) which is connected to the controller board 24 to permit the controller board 24 to communicate with other devices on the MAP network 21.

In the preferred embodiment, the controller board 24, floppy disc drive 26, hard card 28 and LAN card 30 are housed together in a controller box 40, such as a MIC-200 Minicell Controller, sold by the Square D Company. The controller box 40 includes an internal passive back plane containing PC bus interface connectors (not shown) housed in a metal chassis for placement in a register rack or mounted independently on a wall or other surface.

The LAN card 30 can be a Square D Company Type SFI-5xx SY/LINK communications board which gives the controller box 40 direct access to the LAN 31 for communication with programmable controllers coupled thereto. In the present illustration, first and second PLCs 41,42, are shown coupled to the LAN 31; however many more such PLCs can be connected to the LAN 31. The LAN card 30 has two communication ports for cable connection and the board edge connector which is the communication link between the board and the controller box 40. The LAN card 30 includes a 9 pin, D-type female connector which allows the PLCs 41,42 on the LAN network to access the MAP network 21 via the LAN card 30.

The floppy disc drive 26 comprises a standard 3.5 inch, 720k byte, double sided, double density floppy disc drive. The floppy disc drive 26 is utilized to load operating software onto the hard card 28. The hard card 28 consists of a fixed disc media mounted on a PC board which plugs into a slot on the back plane of the controller box 40. This non-volatile hard card 28 is necessary to store the operating software.

The printer 36 may be a standard parallel printer, and the keyboard 32 may be an IBM ® AT or compatible keyboard. The monitor 34 may be a standard video display having CGA, EGA or Hercules-Monochrome Graphics capability.

Figure 2:
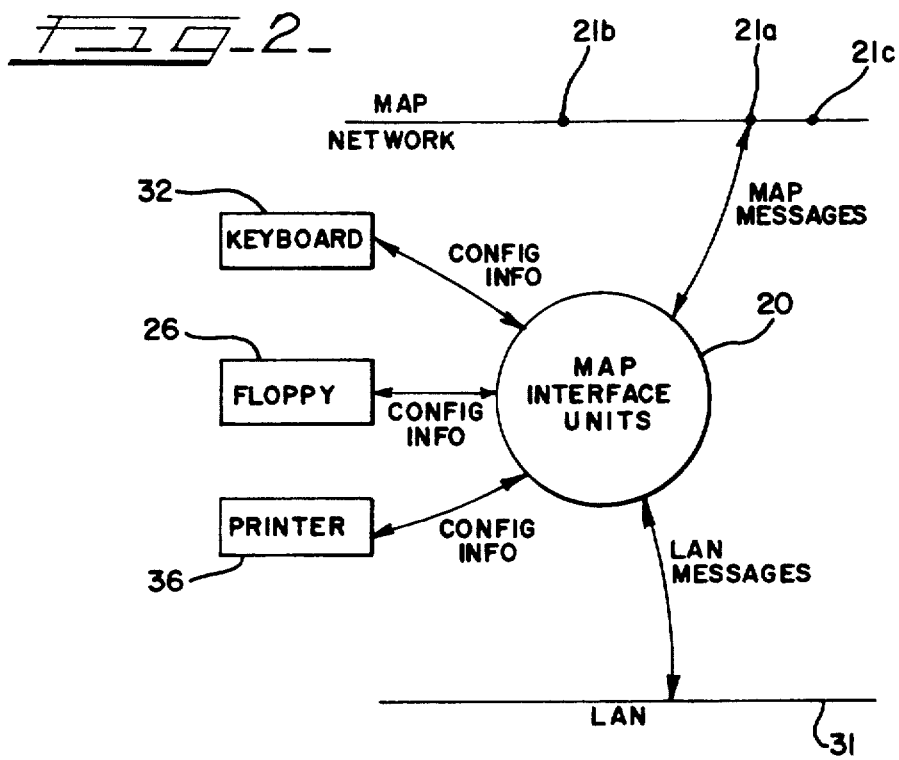
FIG. 2 is a context diagram of the MAP interface unit of FIG. 1.

The MIU 20 as it operationally relates to connected peripheral devices is illustrated in context diagram form in FIG. 2. The MIU 20 exchanges configuration information regarding the status and configuration of the entire system with the keyboard 32, the floppy disc drive 26 and the printer 36. Further, in accordance with the configuration information, the MIU 20 exchanges MAP messages comprising MAP requests and MAP responses with MAP nodes 21b, c, to which are coupled other MAP compatible devices, such as a computer 44. It is contemplated that many other devices can be coupled to the MAP network 21; however, for illustration purposes, only the computer 44 will be discussed, but is representative of the other coupled devices. Additionally, the MIU 20 exchanges LAN messages comprising LAN requests and LAN responses with first and second PLCs 41, 42 on the LAN 31.

The MIU 20 is transparent to the computer 44 in that each of the PLCs 41,42 appears to the computer 44 as a single virtual manufacturing device. For example, assume the computer 44 wants to read a temperature value that is stored in a particular register of the PLC 41. Rather than needing to know the particular register number of the PLC 41 containing the temperature value, as well as the particular command to read the particular register, the computer 44 needs only to request a temperature read according to standard MAP protocol, and the MIU 20 translates this MAP protocol temperature request to the particular register request necessary, obtains the temperature value, and transmits the temperature value back to the computer 44.

Figure 3:
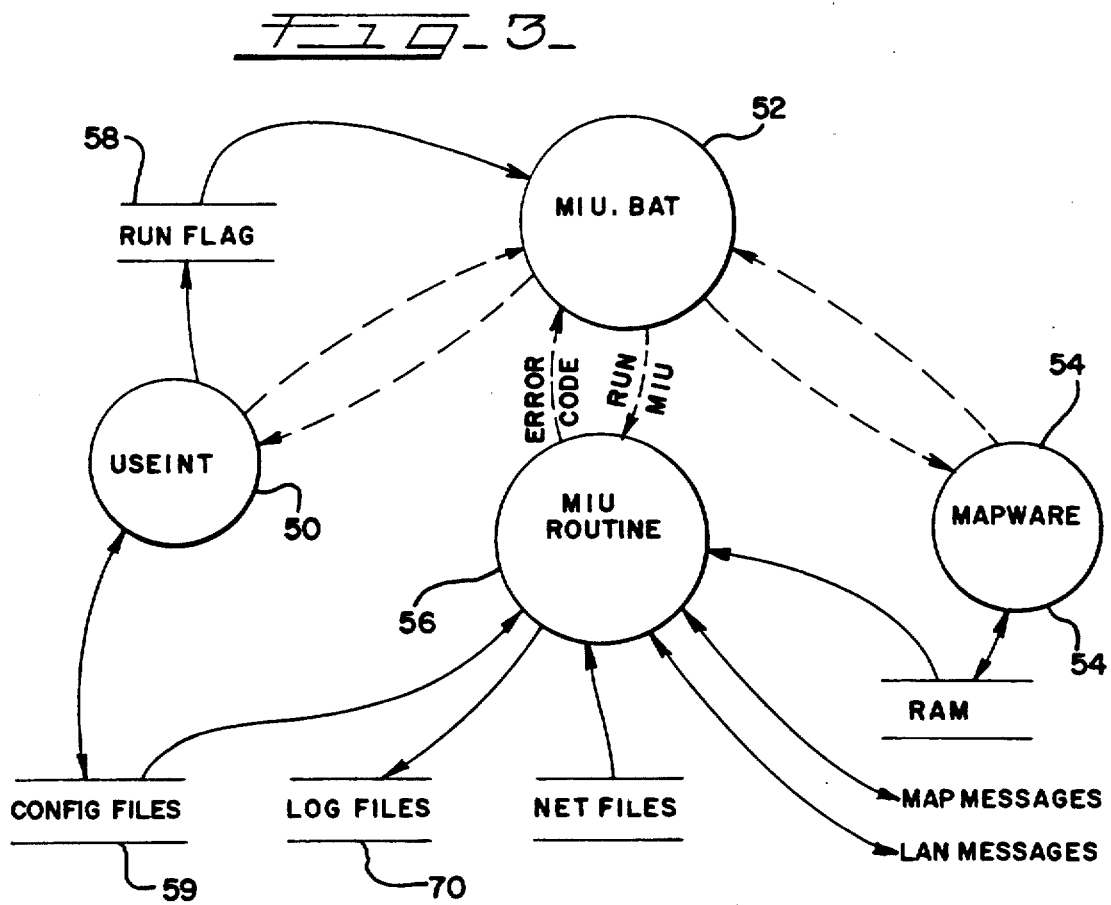
FIG. 3 is a data flow diagram of the MAP interface unit of FIG. 1.

A generalized data flow diagram of MIU software is illustrated in FIG. 3. The MIU software conceptually is shown as circles representing four primary routines; though when compiled the four routines are indistinct. The four routines comprise a user interface routine 50, a MIU batch file 52, a Mapware routine 54 and an MIU routine 56. In FIG. 3, the solid lines represent data flow of information while the dotted lines represent commands.

The MIU batch file 52 runs upon power up of the MIU 20 and controls which of either the user interface routine 50 or the MIU routine 56 will run, depending on the setting of a run flag 58. The user interface routine 50 permits the user to enter configuration data, such as identification of MAP nodes, LAN devices and other necessary variables, into a configuration file 59. Once this information is entered and connected, the run flag 58 is set such that for all future power-ups, control will directly pass to the MIU routine 50 upon power up.

If the run flag 58 is not set when the MIU 20 powers up, the MIU batch file routine 52 causes the user interface routine 50 to run, displaying a menu on the monitor 34. The menu includes the following options:
1) set security level;
2) edit configuration data;
3) run gateway (i.e., MIU routine 56);
4) display configuration data;
5) print configuration data;
6) backup/restore configuration files;
7) system date/time; and
8) exit to DOS.

The first option, set security level, permits user selectable control of access to use and modification of the system.

The second option, edit configuration data, is of primary importance to the operation of the MIU 20 and permits adding and editing of configuration data in the configuration file 59. Specifically, through this option, one enters configuration data about all possible connections and naming conventions of devices and variables on both the MAP network 21 (MAP configuration data) as well as the LAN 31 (LAN configuration data). The configuration data includes LAN configuration data identifying devices coupled to the LAN 31, and MAP configuration data identifying devices coupled to the MAP network 21. The LAN configuration data includes a list of all of the programmable logic controllers connected to the LAN 31, which in the illustrated case comprises the PLCs 41,42. A unique identifying name is assigned to each of the PLCs 41,42, and variables are assigned for each. In addition, each variable is assigned read/write protection, and MAP nodes are specified having access to these variables. A unique number is assigned for each of the PLCs 41,42 as well as the address of each of the PLCs 41,42 on the LAN 31. A first series of three digits is automatically placed on the address, representing the MAP address of the MIU 20 on the MAP network 21. In addition, a name can be assigned to a programmable controller variable, for example a bit of a register. These are referenced as named variables by a communicating MAP node when reading or writing to a register of one of the PLCs 41,42. In the example above wherein the computer 44 was requesting a temperature read with such information being stored in the PLC 42, the respective register of the PLC 42 would be assigned the name "temperature". Thus when a temperature read request is received by the MIU 20 from the computer 44, the MIU 20, in accordance with the configuration data, recognizes this as a request for the data in the respective assigned register of the PLC 42.

Similarly, MAP configuration data is also established. This MAP configuration data identifies each of the MAP nodes with which any of the PLCs 41,42 desires to connect and communicate with.

The Mapware routine 54 is provided with the Concord modem. Signals on the MAP network 21 are converted by the Concord modem into a form recognized by the controller board 24, and vice versa. In effect, the Mapware routine 54 builds layers 1-6 of the MAP communication protocol, and the MIU routine 56 provides layer 7, that of deciphering and decoding the application layer.

The MIU routine 56 translates the messages received from the MAP network 21 to a form recognizable on the LAN 31, and translates LAN type information to a form which the Mapware routine 54 can place on the MAP network 21.

The MIU routine 56 is illustrated in greater detail in the data flow diagram of FIG. 4. The MIU routine 56 includes a MAP interface routine 60 and an LAN interface routine 62. Conceptually disposed between the MAP interface routine 60 and the LAN routine 62 are a MAP request queue 64, a MAP response queue 66, an LAN request queue 68 and an LAN response queue 70. The queues 64, 66, 68 and 70, respectively store requests and responses between the MAP network 21 and the LAN network 31. The same structure is used for each of the queues 64, 66, 68 and 70, and each can store up to eight messages at one time.

When running the MIU routine 56, the MIU 20 via an MIU control 71 alternates between operating the MAP interface routine 60 and the LAN interface routine 62. Thus if a request is received from the computer 44, the MAP interface routine 60 places the request in the MAP request queue 64. Control then is switched to the LAN interface routine 62 which polls the MAP request queue 64 for any queued MAP requests. Finding a queued MAP request in the MAP request queue 64, the LAN interface routine 62, utilizing the configuration data, determines the register location(s) of the requested data and directs the request to the proper register. After the LAN interface routine 62 has accessed the proper one of the PLC registers, the LAN interface routine places the requested data in the MAP response queue 66. Control then returns to the MAP interface routine 60 which polls the MAP response queue 66 and translates the data therein to the proper format for conversion by the Mapware routine 54 to be then dispatched on the MAP network 21 to the computer 44.

Similarly, either of the first or second PLCs 41,42 can initiate a request to devices on the MAP network 21, such as the computer 44. For example, if the first PLC 41 desires to query the computer 44, the first PLC 41 initiates a write command to the MAP interface module 20. The LAN interface routine 62 responds to the write command and writes the command in the LAN request queue 68. Control then passes to the MAP interface routine 60, which polls the LAN request queue 68 and converts the request to the format which the Mapware routine 54 can then direct to the computer 44 via the MAP network 21. The response from the computer 44 is then placed in the LAN response queue 70 by the MAP interface routine 60 where it is then translated by the LAN interface routine 62 to the proper format for placement in the proper register of the first PLC 41, again pursuant to the previously entered configuration data.

The MIU routine further includes an MIU log 72 which logs in a Log Files queue the requests and responses passing between the MAP interface routine 60 and the LAN routine 62.

The MIU 20 further provides for an effective Global PLC, illustrated on FIG. 1 as a Global PLC 73, wherein devices on the MAP network 21, such as the computer 44, can obtain data from a plurality of devices on the LAN 31, such as both of the PLCs 41,42, in a single request. The Global PLC 73 is a function created and maintained by the MIU routine 56. The Global PLC 73 has a unique MAP network name and global variable data fields. The MAP network name and global variable data fields are initially defined by the user through the user interface routine 50 and are stored in the configuration file 59. The variable data fields store correlation tables which correlate global variables to the corresponding register addresses of the first and second PLCs 41, 42. The configuration files 59 are stored on the hard card 28 (FIG. 1). To increase response speed during run-time, this information is read by the MIU routine 56 upon start up, transformed into a run-time gateway data structure 100 by an MIU initialize routine 101, and stored in RAM memory of the MIU 20.

The gateway data structure 100 provide linking and addressing information between global variables and their respective PLC network addressing on the LAN 31. The gateway data structure 100 also identifies global variables of the Global PLC with data flags. These global variables "appear" to a device on the MAP 21, such as the computer 44, as elements of the Global PLC 73.

If the computer 44 needs to access a global variable which data is stored in both the PLC 41 and the PLC 42, the computer 44 establishes a logical connection to the Global PLC 73. The Global PLC 73 then reads the global variable stored in the gateway data structure 100, which identifies the address of the requested global variable in the PLCs 41, 42. For example, a global variable "temperature A" may physically exist on the PLC 41 and a global variable "temperature B" may physically exist on the PLC 42. After establishing a MAP connection to the Global PLC 73, the computer 44 reads the global variables "temperature A" and "temperature B" without closing and re-establishing a MAP connection to a second device. The resulting operation of reading the two global variables is much faster and requires less computer resources than using two discrete MAP channels to perform the same operation.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. A Manufacturing Automation Protocol (MAP) interface unit for coupling a local area network (LAN), to a MAP network for the transmission of messages or data there between, said LAN including a plurality of programmable logic controllers (PLC) and said MAP network including a plurality of MAP devices, the MAP interface unit comprising:
   (a) first coupling means coupled to the MAP network for transmitting messages or data from said MAP interface unit to said MAP network;
   (b) second coupling means coupled to the LAN for transmitting messages or data from said MAP interface unit to said LAN;
   (c) means disposed and connected between said first coupling means and said second coupling means for converting a MAP message or data from a respective one of said MAP devices on said MAP network into a LAN message for transmission to a respective one of said PLCs and for converting a LAN message or data from said respective one of said PLCs connected on said LAN network into a MAP message for transmission to a respective one of said MAP devices; and
   (d) wherein said MAP messages and said LAN messages comprise requests for data and responses with data between said PLCs and said MAP devices.

2. The MAP interface unit of claim 1 wherein said first coupling means includes a modem.

3. The MAP interface unit of claim 1 wherein said means connected and disposed between said first coupling means and said second coupling means includes a controller board for performing a plurality of routines, one of said routines for creating a functional global PLC, said global PLC including means for permitting said MAP devices to obtain data from said plurality of said PLCs in a single request.

4. A Manufacturing Automation Protocol (MAP) interface unit for coupling a local area network (LAN) including a plurality of programmable logic controllers (PLCs) connected thereto to a MAP network for the transmission of messages or data therebetween including a plurality of MAP devices connected thereto, the MAP interface unit comprising:
   (a) a first coupling means connected to the MAP network for transmitting messages or data from said MAP interface unit to said MAP network;
   (b) a second coupling means connected to the LAN for transmitting messages or data from said MAP interface unit to said LAN;
   (c) a controller board means connected between the first and second coupling means for performing a plurality of routines, said plurality of routines including a MAP interface routine and a LAN interface routine, and responsive to messages and data from either the LAN or MAP network for controlling the transmission of messages and data through said first and second coupling means;
   a MAP request queue means connected to the MAP unit and accessible by said MAP interface routine and said LAN interface routine running in said controller for storing a MAP request consisting of a request for data from a respective one of said PLCs by a respective one of said MAP devices and received from said MAP interface routine;
   (e) means for determining a corresponding LAN address of said respective PLC;
   (f) means for sending by said LAN interface routine said stored MAP request to said corresponding LAN address;
   (g) a MAP response queue means connected to the controller and accessible by said MAP interface routine and said LAN interface routine, for storing a MAP response generated in response to said sent MAP request by said respective PLC;
   (h) means for receiving by said LAN interface routine said MAP response and storing said MAP response in said MAP response queue;
   (i) means for determining a corresponding MAP address of said MAP device of said stored MAP response; and
   (j) means for sending by said MAP interface routine said MAP response from said MAP response queue to said corresponding MAP address.

5. The MAP interface unit of claim 4 including
   (a) a LAN request queue means connected to the controller and responsive to the data generated by said MAP interface routine and said LAN interface routine for storing a LAN request received from the data generated by said LAN interface routine, said LAN request consisting of a request for data by a respective one of said PLCs from a respective one of said MAP devices and received from said LAN interface routine;
   (b) means for determining a corresponding MAP address of said respective MAP device;
   (c) means for sending data from said MAP interface routine and said stored LAN request to said corresponding MAP address;
   (d) a LAN response queue means connected to said controller and responsive to data generated by said MAP interface routine and said LAN interface routine for storing a LAN response generated in response by said respective MAP device to said sent LAN request;
   (e) means for determining a corresponding LAN address of said respective PLC of said stored LAN response; and
   (f) means for sending by said LAN interface routine said LAN response from said LAN response queue to said corresponding LAN address.

6. The MAP interface unit of claim 5 wherein said plurality of routines includes a routine for creating a functional global PLC, said global PLC including global means for permitting MAP devices to obtain data from said plurality of PLCs in a single request.

7. The MAP interface unit of claim 6 wherein said global means includes means for storing correlation tables which correlate global variables to corresponding register addresses of the PLCs.

8. The MAP interface unit of claim 7 wherein said correlation table storing means comprises RAM memory.

9. A Manufacturing Automation Protocol (MAP) interface unit for coupling a local area net (LAN) including a plurality of programmable logic controllers (PLCs) to a MAP network including a plurality of MAP devices for transmission of data and messages therebetween, the MAP interface unit comprising:
   (a) first coupling means for coupling said MAP interface unit to said MAP network;
   (b) a second coupling means for coupling said MAP interface unit to said LAN;
   (c) a controller board connected between the first and second coupling means for performing a plurality of routines, said plurality of routines including a MAP interface routine for controlling said first coupling means and a LAN interface routine for controlling said second coupling means;
   (d) means connected to the controller board for storing MAP request data received from said MAP interface routine, said MAP request data consisting of a request for data from a respective one of said PLCs by a respective one of said MAP devices and received from said MAP interface routine;
   (e) means for determining a corresponding LAN address of said respective PLCs;
   (f) means responsive to said LAN interface routine for sending said stored MAP request to said corresponding LAN address;
   (g) a MAP response queue means responsive to said MAP interface routine and said LAN interface routine for sending a MAP response generated in response to said sent MAP request by said respective PLCs;
   (h) means for receiving data from said LAN interface routine said MAP response and for storing said MAP response in said MAP response queue;
   (i) means for determining a corresponding MAP address of said respective MAP device of said stored MAP response;
   (j) means responsive to data generated by said MAP interface routine for sending said MAP response from said MAP response queue to said corresponding MAP address;
   (k) means for storing a LAN request generated by said LAN interface routine, said LAN request consisting of a request for data from a respective one of said MAP devices by a respective one of said PLCs;
   (l) means for determining a corresponding MAP address of said respective MAP device;
   (m) means for sending said stored LAN request to said corresponding MAP address;
   (n) a LAN response queue means connected to the controller and responsive to data generated by said MAP interface routine and said LAN interface routine;
   (o) means for sending a LAN response generated in response to said sent LAN request by said respective MAP device to said LAN response queue;
   (p) means for determining a corresponding LAN address of said respective PLC of said stored LAN response; and
   (q) means for directing said LAN response from said LAN response queue to said corresponding LAN address.

10. The MAP interface unit of claim 9 wherein said plurality of routines includes a routine for generating a functional global PLC, said global PLC including global means for permitting MAP devices to obtain data from said plurality of PLCs in a single request.

11. The MAP interface unit of claim 10 wherein said global means includes means for storing correlation tables which correlate global variables to corresponding register addresses of the PLCs.

12. The MAP interface unit of claim 11 wherein said correlation table storing means comprises RAM memory.

* * * * *